(12) United States Patent
Bracher

(10) Patent No.: US 12,099,071 B2
(45) Date of Patent: Sep. 24, 2024

(54) LOCKING ASSEMBLY FOR A MEASUREMENT SYSTEM

(71) Applicant: Micromeritics Instrument Corporation, Norcross, GA (US)

(72) Inventor: Paul Bracher, Suwanee, GA (US)

(73) Assignee: Micromeritics Instrument Corporation, Norcross, GA (US)

( * ) Notice: Subject to any disclaimer, the term of this patent is extended or adjusted under 35 U.S.C. 154(b) by 88 days.

(21) Appl. No.: 18/185,757

(22) Filed: Mar. 17, 2023

(65) Prior Publication Data

US 2023/0324427 A1   Oct. 12, 2023

Related U.S. Application Data

(63) Continuation of application No. 17/388,080, filed on Jul. 29, 2021, now Pat. No. 11,609,240, which is a
(Continued)

(51) Int. Cl.
*G01N 35/10* (2006.01)
*B01L 9/00* (2006.01)
(Continued)

(52) U.S. Cl.
CPC ............... *G01N 35/10* (2013.01); *B01L 9/00* (2013.01); *B01L 9/06* (2013.01); *G01N 35/028* (2013.01);
(Continued)

(58) Field of Classification Search
CPC .......... G06Q 10/0639; G06Q 10/06393; H04L 41/142; H04L 41/147; H04L 41/16;
(Continued)

(56) References Cited

U.S. PATENT DOCUMENTS

| 3,863,426 A | 2/1975 | Courvalin |
| 4,601,448 A | 7/1986 | Miyazaki et al. |

(Continued)

FOREIGN PATENT DOCUMENTS

| CN | 104105969 A | 10/2014 |
| DE | 2849133 A1 | 5/1980 |

(Continued)

OTHER PUBLICATIONS

Extended European Search Report for related Application No. 19743722.1 dated Sep. 28, 2021.
(Continued)

*Primary Examiner* — Jennifer Wecker
*Assistant Examiner* — Jonathan Bortoli
(74) *Attorney, Agent, or Firm* — Womble Bond Dickinson (US) LLP

(57) ABSTRACT

The present disclosure is, in one aspect, directed to a locking assembly for securing a sample tube assembly to a sample manifold of a measurement system. The locking assembly includes a ramp block having one or more slots defined therein and configured to at least partially receive a portion of the sample tube assembly. The ramp block also includes a plurality of surface features defined therealong and configured to engage and move the sample tube assembly toward and into engagement with the sample manifold. The ramp block further is movable between a plurality of positions including an open position for allowing the sample tube assembly to be received through the one or more slots or openings, and a closed position substantially sealing the sample tube assembly against or within the sample manifold. Other aspects also are described.

13 Claims, 17 Drawing Sheets

Related U.S. Application Data continuation of application No. 16/259,151, filed on Jan. 28, 2019, now Pat. No. 11,105,825.

(60) Provisional application No. 62/623,168, filed on Jan. 29, 2018.

(51) Int. Cl.
  *B01L 9/06* (2006.01)
  *G01N 35/02* (2006.01)
  *G01N 35/04* (2006.01)

(52) U.S. Cl.
  CPC ............ *B01L 9/50* (2013.01); *B01L 2200/025* (2013.01); *B01L 2200/0689* (2013.01); *G01N 2035/0403* (2013.01); *G01N 2035/0406* (2013.01)

(58) Field of Classification Search
  CPC ......... H04L 43/08; H04L 45/08; H04L 45/22; B01L 2200/025; B01L 2200/0689; B01L 9/00; B01L 9/06; B01L 9/50; F16L 37/008; F16L 37/144; F16L 37/56; G01N 1/44; G01N 15/0806; G01N 2001/002; G01N 2035/00346; G01N 2035/009; G01N 2035/0403; G01N 2035/0406; G01N 35/00584; G01N 35/028; G01N 35/10; G01N 35/1011
  See application file for complete search history.

(56) References Cited

U.S. PATENT DOCUMENTS

| | | | |
|---|---|---|---|
| 4,869,117 A | | 9/1989 | McAndless et al. |
| 4,976,924 A | * | 12/1990 | McAndless ............ G01N 35/04 |
| | | | 422/549 |
| H2052 H | | 12/2002 | Molz, III et al. |
| 11,105,825 B2 | | 8/2021 | Bracher |
| 11,609,240 B2 | | 3/2023 | Bracher |
| 2002/0144541 A1 | | 10/2002 | Molz, III et al. |
| 2011/0200500 A1 | * | 8/2011 | Feilders ................ H05B 6/806 |
| | | | 422/537 |
| 2012/0120757 A1 | | 5/2012 | Deal et al. |

FOREIGN PATENT DOCUMENTS

| | | | |
|---|---|---|---|
| GB | 2143468 A | | 2/1985 |
| JP | 57-038028 | | 3/1982 |
| JP | 57-148258 | | 9/1982 |
| JP | 58-141857 | | 8/1983 |
| JP | 60-026872 | | 2/1985 |
| JP | 2006145381 A | | 6/2006 |
| JP | 2011251819 A | | 12/2011 |
| JP | 2012-112734 | | 6/2012 |
| JP | 2012112734 A | | 6/2012 |
| JP | 2016065885 A | | 4/2016 |
| WO | WO2005/012655 A1 | | 2/2005 |
| WO | WO2017/194927 A1 | | 11/2017 |

OTHER PUBLICATIONS

Notification of Transmittal with International Search Report and Written Opinion for related Application No. PCT/US19/15407, mailed Apr. 25, 2019.

* cited by examiner

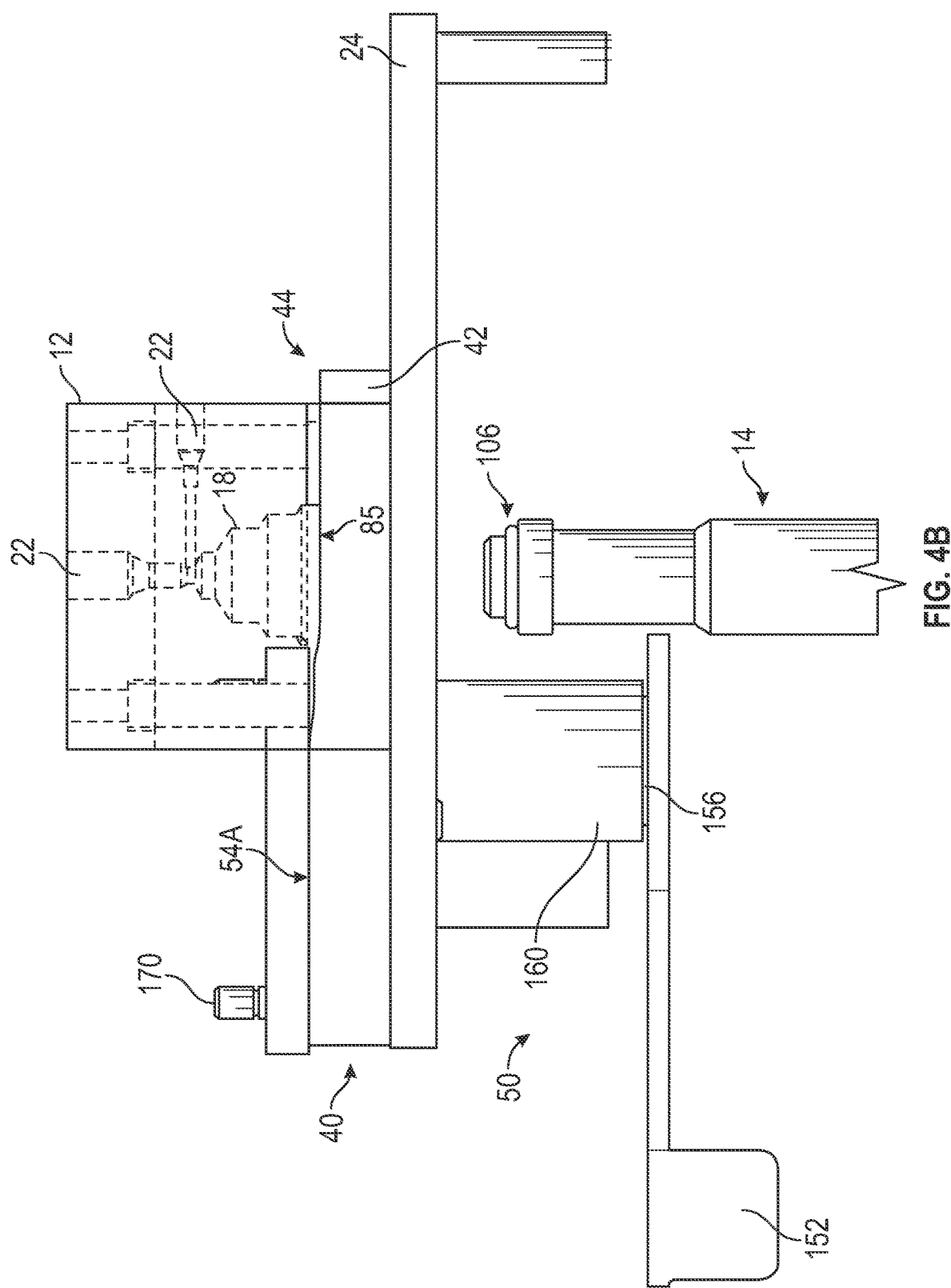

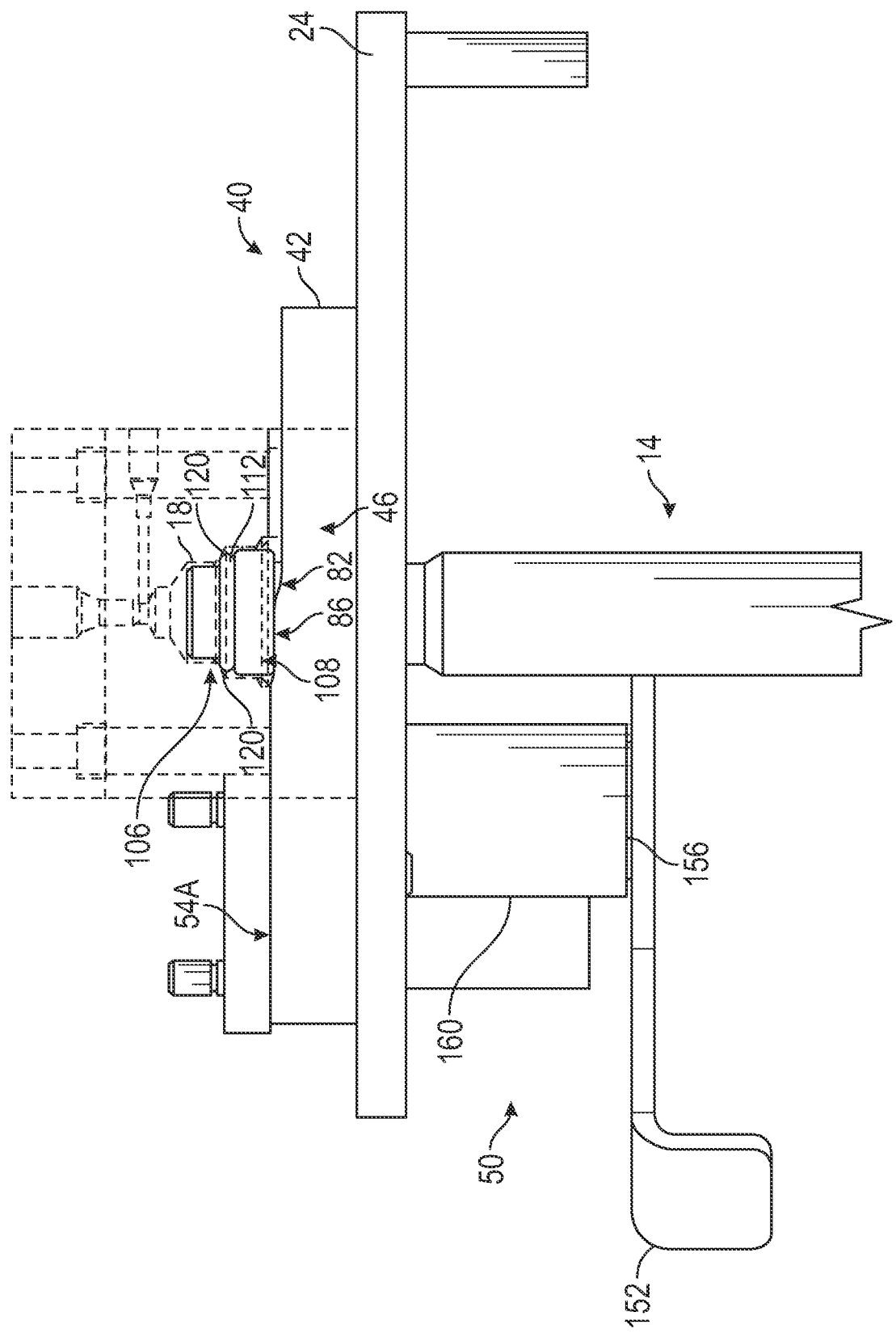

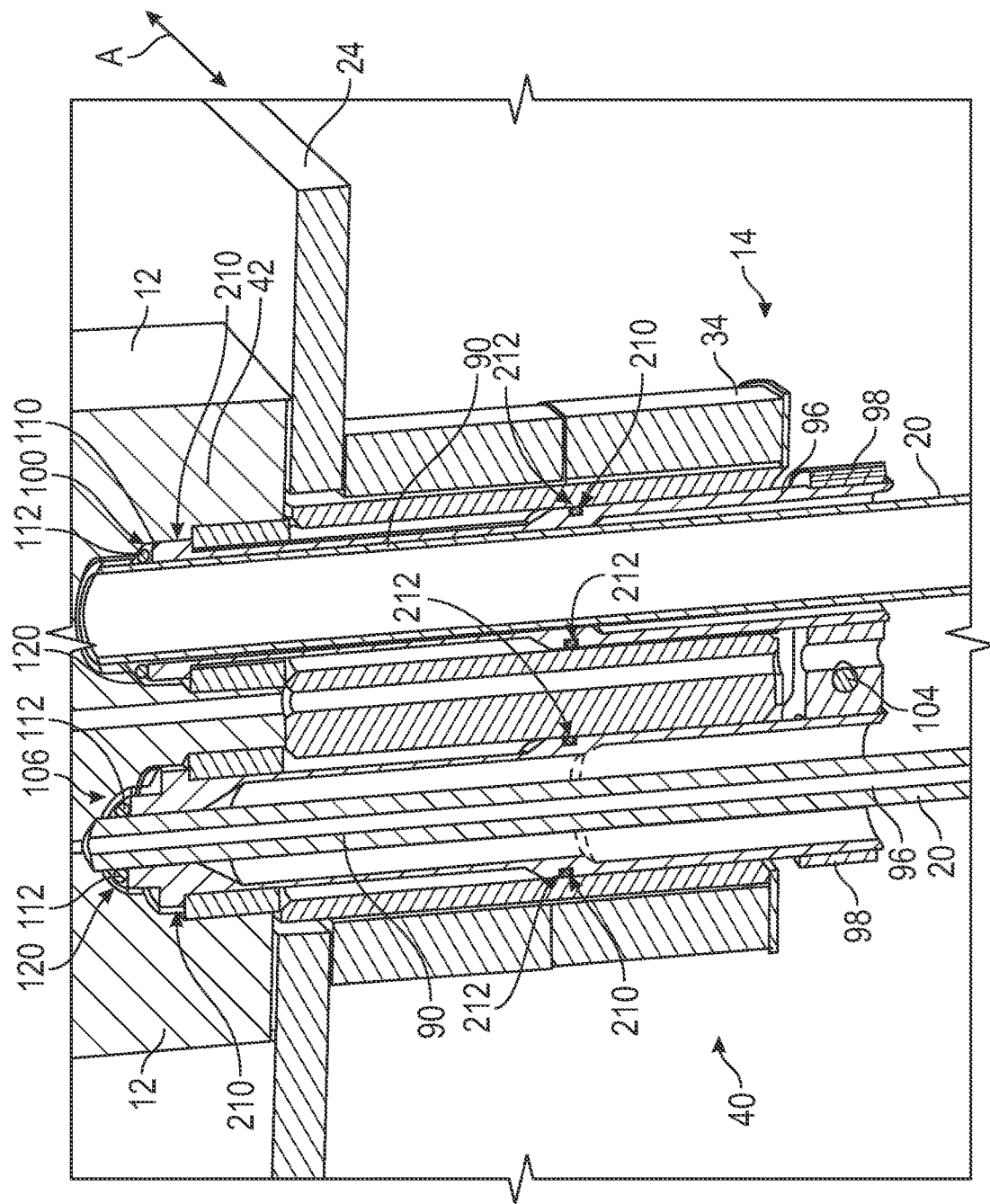

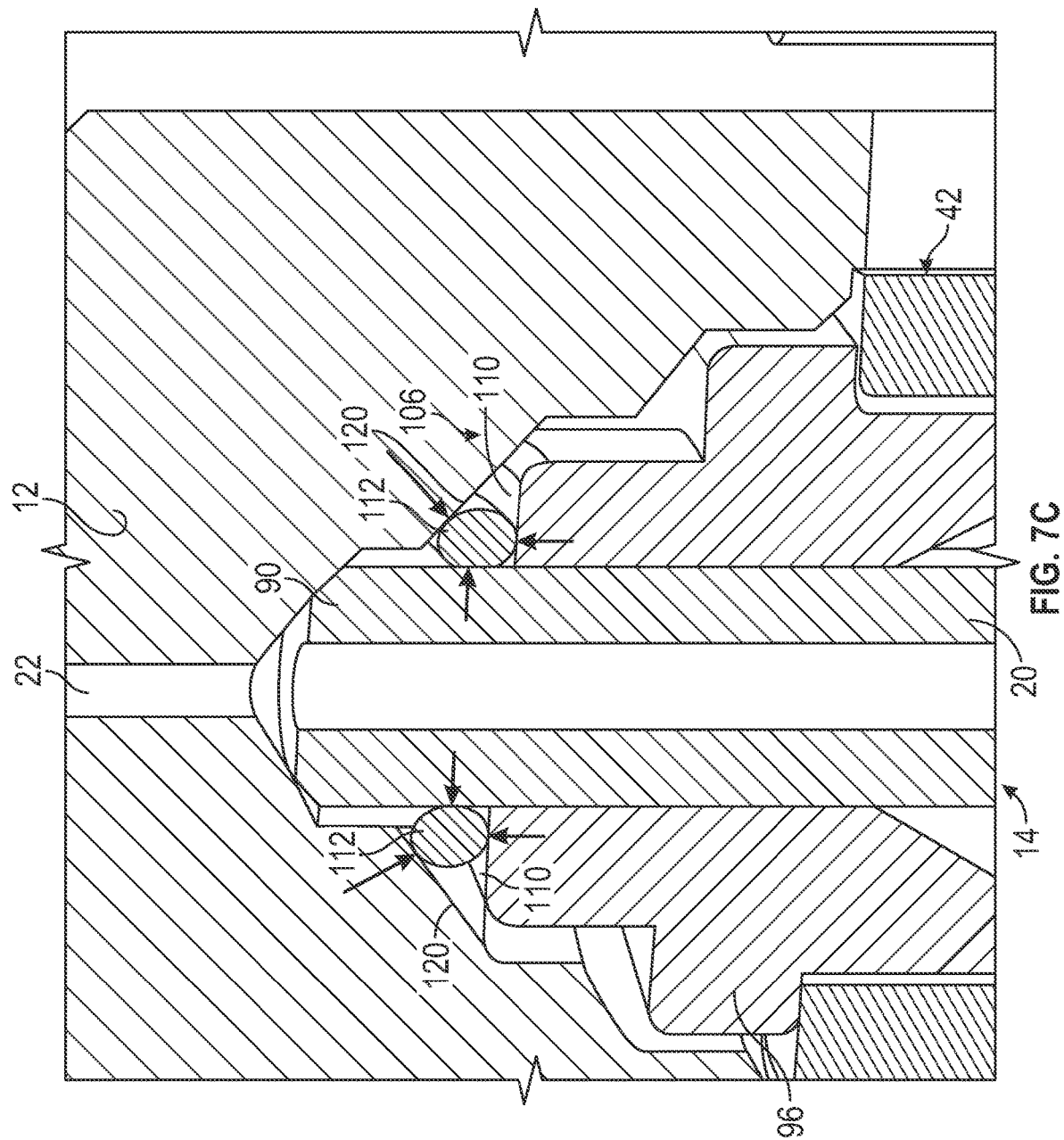

LOCKING ASSEMBLY FOR A MEASUREMENT SYSTEM

CROSS-REFERENCE TO RELATED APPLICATION

The present Patent Application is a Continuation of co-pending U.S. application Ser. No. 17/388,080, filed Jul. 29, 2021, which is a continuation of U.S. patent application Ser. No. 16/259,151, filed Jan. 28, 2019, now U.S. Pat. No. 11,105,825, issued on Aug. 31, 2021, which claims the benefit of U.S. Provisional Patent Application No. 62/623,168, which was filed on Jan. 29, 2018.

INCORPORATION BY REFERENCE

The disclosures of U.S. application Ser. No. 17/388,080, filed Jul. 29, 2021, U.S. application Ser. No. 16/259,151, filed Jan. 28, 2019, U.S. Provisional Patent Application No. 62/623,168, which was filed on Jan. 29, 2018, are hereby incorporated by reference for all purposes as if presented herein in their entireties.

TECHNICAL FIELD

Embodiments of the present disclosure generally are directed to measurement systems, and more specifically, locking assemblies for securing a sample tube assembly within a sample manifold of a measurement system. Other aspects also are described.

BACKGROUND

It can be awkward or difficult to load one or more sample tube(s) into a receiving manifold of a measurement system. For example, loading or attaching sample tube(s) may require handling multiple loose parts, sometimes only using one hand. The sample tube(s) further may be significantly hot or cold to the touch due to the use of high or low temperature gases or liquids in testing of the samples and/or heating or cooling of the sample tubes, which can lead to sample tubes being dropped and damaged. Additionally, such sample tube(s) typically are attached or loaded into many types of measurement systems by sample tube collet nuts, e.g., by rotating one or more threaded connectors, which rotation can cause damage to the sample tube, or sealing mechanisms attached thereto, e.g., due to friction between surfaces of the measurement system and the sample tube or sealing mechanisms. The friction from rotation further can damage the sample tube, and/or tear, rip, or otherwise damage any sealing members attached thereto, potentially causing leaks or sealing failures during testing. Sample tube retaining mechanisms further can be over or under rotated during loading, causing inconsistent loading (i.e., over or under compression) of the sealing members, which may result in inadequate sealing or damage to the sample tube and/or sealing member. Accordingly, it can be seen that a need exists for a locking assembly for a sample tube assembly that allows for ease of attachment and facilitates the application of a substantially consistent force or stress between the sample tube assembly and the manifold, as well as addressing other related and unrelated issues or problems in the art.

SUMMARY

Briefly described, the present disclosure is, in one aspect, directed to a locking assembly configured for securing a sample tube assembly to a sample manifold of a measurement system. The locking assembly may include a ramp block that is movable between a plurality of positions to receive and secure the sample tube assembly to the sample manifold. The ramp block can include a body with one or more slots defined therein for receiving at least a portion of the sample tube assembly. The ramp block further can include surface features (e.g., including angled or ramped surfaces) configured to engage and move the sample tube assembly toward and into engagement with the sample manifold as the ramp block is moved between the plurality of positions.

In one embodiment, the plurality of positions can include an open position with the ramp block positioned/arranged to allow the sample tube assembly to be received or passed through one or more slots or openings in the ramp block. The plurality of positions also can include one or more intermediate positions, such as a semi-closed position or other intermediate position, wherein the sample tube assembly is held within the sample manifold, but only a partial seal is made or a complete seal is not made between the sample manifold and the sample tube assembly, though the plurality of intermediate positions can include other positions where no seal is made between the sample tube assembly and the sample manifold. The plurality of positions additionally can include a closed position wherein the sample tube assembly is in a locked position, with the sample tube assembly substantially sealed against or within the sample manifold to allow for testing of one or more samples received therein.

In addition, the locking assembly may include a lever mechanism or other actuator, for example, a motor or other suitable actuator, operable to move the ramp block between the plurality of positions. The lever mechanism can be in communication with a drive shaft that is communicatively coupled to the ramp block to drive movement thereof.

Further, the locking assembly can include a feedback assembly for locating the ramp block and to provide haptic feedback to the user so as to indicate that the ramp block is in a specific position, e.g., an open position, a semi-closed position, a closed position, or another suitable intermediate position or location. In one embodiment, the feedback assembly can include a plurality of detents defined along the driveshaft and a plunger assembly mounted adjacent thereto. The plunger assembly can include a spring loaded plunger that can be selectively received within the detents to provide haptic feedback to the user. The plunger assembly and detents further may help to hold the locking assembly in a specific position, e.g., an open position, a semi-closed position, a closed position, or another suitable intermediate position or location. In one example embodiment, the feedback assembly may communicate with a controller, control system, or other computing device having a processor that is operatively connected thereto to provide feedback to a user, such as to notify the user that a sample tube is, or is not, installed/sealed properly within the sample manifold.

In one exemplary embodiment, the sample tube assembly can include a U-shaped sample tube having a pair of legs each with an opening at an upper portion thereof for receipt of one or more samples therein. The sample tube assembly additionally can have one or more sealing members, such as O-rings formed from an elastomer or other sealing material, that are sized to be substantially self-retaining, e.g., to be at least partially received within a seat, along the upper portion of the sample tube assembly.

The sample tube assembly also can include a collet assembly that can be at least partially received about the legs of the sample tube. The collet assembly can include collets that can be attached to each other, e.g., using a clamping mechanism. The clamping mechanism can have front and rear clamp portions that are attached or tightened together using a fastener. The legs of the sample tube(s) can be at least partially received between the connected collets and retained in place by the O-ring(s) received on protruding ends of the legs of the sample tube. Each of the collets may have a body with a groove or notch defined therein along/adjacent to a top portion thereof, which notch or groove can be sized, dimensioned, or otherwise configured to receive at least a portion of the ramp block. The notch/groove further can define a shoulder or face that contacts or engages the surface features of the ramp block.

In one example, the one or more surface features of the ramp block can be shaped, constructed, or otherwise configured to contact or engage the collet assembly (e.g., the shoulder or face defined by the notch/groove) to move or urge the sample tube assembly towards and/or into the sample manifold. For example, the ramp block can include a stepped upper surface having a plurality of substantially flat portions with ramped or angled sections or portions positioned therebetween, which substantially flat portions may generally correspond to the open, closed, or other intermediate positions.

With the ramp block in the open position, the legs of the sample tubes, with the collets attached thereto, can be at least partially received through an opening defined in the ramp block. The lever/actuation mechanism can be activated to move the ramp block to the semi-closed position, or other intermediate position, and one or more ramped/angled sections of the ramp block can at least partially engage the shoulder or face of the collets to move the sample tubes toward and/or at least partially into the sample manifold. The lever/actuation mechanism further can be activated to move the ramp block towards the closed position, and as the ramp block is moved, one or more ramped or angled sections of the ramp block can engage the shoulders or faces of the collets to move the sample tube further into the sample manifold and to urge the sealing members against one or more engagement surfaces defined along bore holes in the sample manifold, substantially sealing the sample tube assembly therein. Additionally, as the lever/activation mechanism is activated to move the ramp block between each of its positions, for example, the open, semi-closed, closed positions, and/or various intermediate positions, the spring-loaded plunger can be received within the detents on the driveshaft to provide haptic feedback on the position of the ramp block. The engagement between the plunger and detents further may help to hold or support the ramp block in each of its positions.

As a result, the sample tube assembly can be reliably loaded into the sample manifold assembly, even when supporting the sample tube assembly with only one hand. Also, the sample tube, or sealing member, can be brought into sealing engagement with the surface of the sample manifold, without rotation, for example, generally using linear motion/movement, that may prevent or minimize damage and/or wear to the sample tube assembly or the sealing member attached thereto (for example, prevent tearing or ripping of the sealing member) and increase the working life of the sample tube assembly and the sealing member. Additionally, the locking assembly of the present disclosure can facilitate the application of a substantially consistent force or stress between the sample tube assembly, e.g., the sealing member, and the sample manifold each time the sample tube is loaded, for example, to prevent over or under compression of the sealing member. The locking assembly thus may further help ensure a proper seal between the sample tube assembly and the sample manifold, and may also help to reduce, minimize, or prevent damage to the sealing member due to over compression/over loading thereof.

Various objects, features and advantages of the present disclosure have become apparent to those skilled in the art upon review of the following detailed description, when taken in conjunction with the accompanying drawings.

BRIEF DESCRIPTION OF THE FIGURES

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which:

FIGS. 4A-C show plan and side views of the locking assembly with the ramp block in the open position.

FIGS. 5A-C show plan and side views of the locking assembly with the ramp block in an intermediate position.

FIGS. 7A-C show cross-sectional views of the locking assembly according to principles of the present disclosure.

DETAILED DESCRIPTION

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
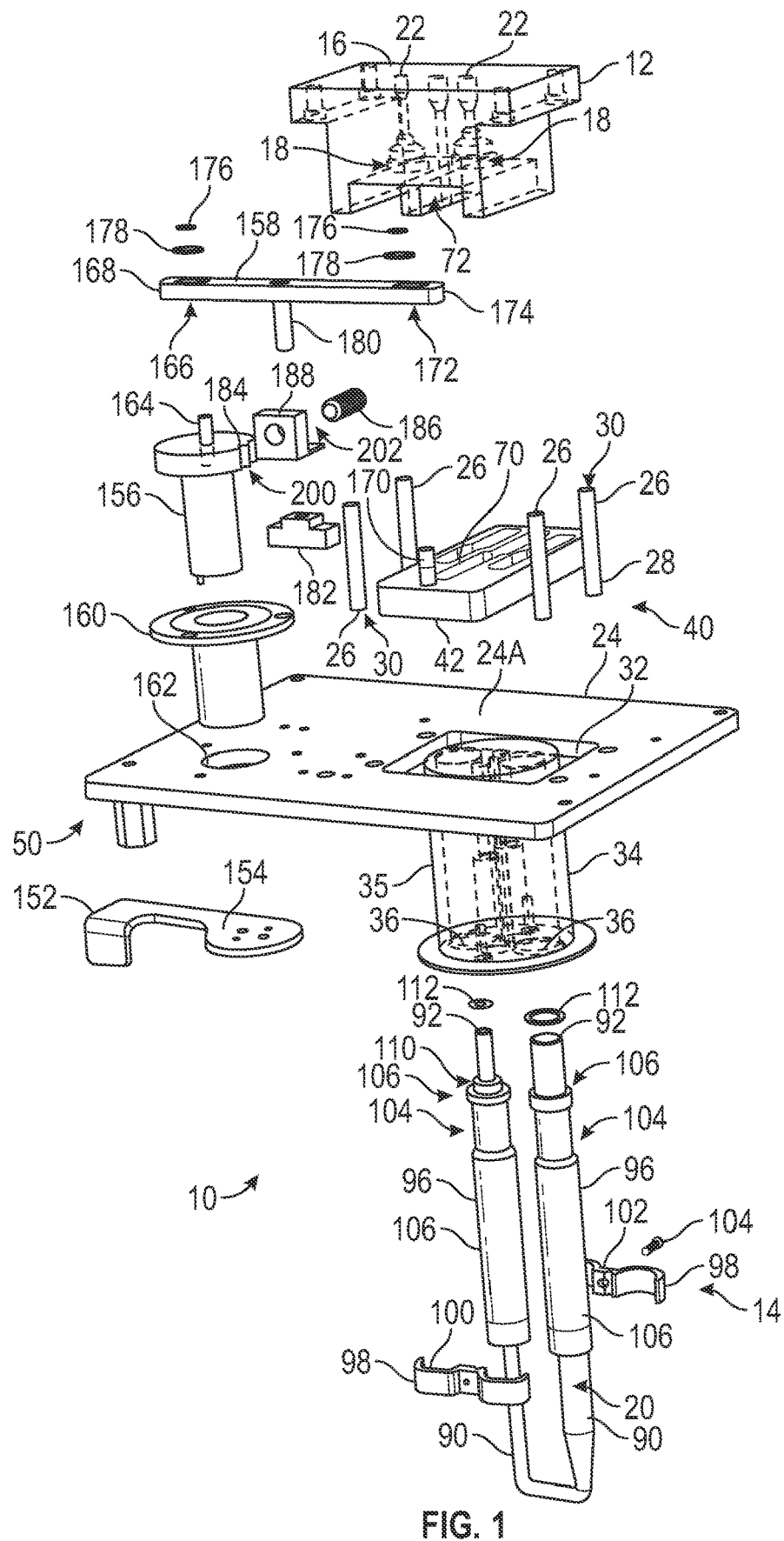
FIG. 1 shows an exploded view of sample port manifold assembly for a measurement system, which sample port manifold assembly having a locking assembly for a sample tube assembly, according to principles of the present disclosure.

FIG. 1 shows an exploded view of a measurement system's sample port manifold assembly 10 with a sample tube locking assembly 40 for a sample tube assembly 14 according to principles of the present disclosure. Various measurement systems can be used, such as the AutoChem systems, ASAP systems, Tristar, and 3Flex systems as provided by Micromeritics Instruments Corporation of Norcross, GA, and/or any other suitable measurement devices or systems that use sample test tubes. In one embodiment, as shown in FIG. 1, the measurement system's sample port manifold assembly 10 can include a sample manifold 12 that is configured to receive one or more sample tube assemblies 14 to communicatively couple or otherwise connect a sample tube assembly 14 to the measurement system's sample port manifold assembly 10. The sample manifold 12 can include a body 16 with one or more sample tube bores or holes 18 defined therein. The sample tube bores/holes 18 generally are sized, dimensioned, and/or configured to receive at least a portion of a sample tube assembly 14, e.g., a portion of a sample tube 20. The bores/holes 18 further are in communication with one or more fluid passageways 22, such as a network of piping, conduits or channels, that allows gas or other fluid media (e.g., liquids, etc.) to transfer between the sample tube 20 and sample port manifold assembly 10 to facilitate testing of a sample or samples received within the sample tube 20.

FIG. 1 further shows that the sample manifold 12 can be connected to an upper surface 24A of a base plate 24 of the measurement system 10, for example, using one or more fasteners (not shown) or other suitable attachment mechanism. Additionally, a plurality of support posts 26 can facilitate attachment of the sample manifold 12 to the base plate 24. For example, the support posts 26 each can have a generally tubular body 28 that has a bore 30 defined therethrough with openings defined at opposite ends to allow the receipt of fasteners for attaching the sample manifold 12 to the base plate 24. The bores 30 can have one or more threaded portions therealong for mateably engaging a threaded fastener, though the bores also can have substantially smooth interior surfaces without departing from the present disclosure. The sample manifold 12 further can be positioned at least partially over and/or along an aperture or opening 32 defined through the base plate 24. The opening 32 generally is sized and/or configured to allow for passage of at least a portion of the sample tube assembly 14 therethrough to allow for receipt of the sample tube assembly 14 at least partially within the bores/holes 18 of the sample manifold 12.

Additionally, an insulation and guide block 34 can be positioned below/underneath the base plate 32. The guide block 34 can have a body 35 with one or more bores or passages 36 defined therethrough. The body 35 of the guide block 34 can be formed from a metal, such as aluminum or other metal, or using other suitable materials, such as plastics, composites, etc., or combinations of these and other materials. The guide block 34 also can be positioned such that the bores or passages 36 defined therethrough generally are substantially coaxial with the bores 18 of the sample manifold 12. Accordingly, the bores 36 of the insulation guide block 34 can guide or direct the sample tube assembly 14 towards the sample manifold 12 as the sample tube assembly 14 is loaded into the sample manifold 12.

In one embodiment, the sample tube 20 can be heated, such as in a furnace assembly, or by other application of heat from a heater, or other suitable heating mechanism, for heating the sample tube. For example, the furnace assembly can heat the sample tube from just about room temperature (or cooler) to temperatures up to approximately 1000° C., though the furnace assembly or heater can be configured to heat the sample tube assembly 14 to any suitable temperature, without departing from the present disclosure, such as temperatures less than 20° C. and/or temperatures greater than 1000° C. Additionally, the sample manifold can be a heated assembly that, for example, can be heated to temperatures up to 150° C. Insulation further can be provided to ensure the temperature between heated zones of the sample manifold and/or sample tube assembly is not altered or otherwise affected by outside influence. In one example embodiment, the insulation can include one or more insulation disks, such as disks formed from Carborundum Duraboard® LD or other suitable insulation materials, to insulate and retain the internal temperatures of the sample tube assembly and prevent or minimize external influences to substantially prevent or substantially minimize transition or transfer of heat to and from the heated zones through the guide block 34.

Figure 4A:
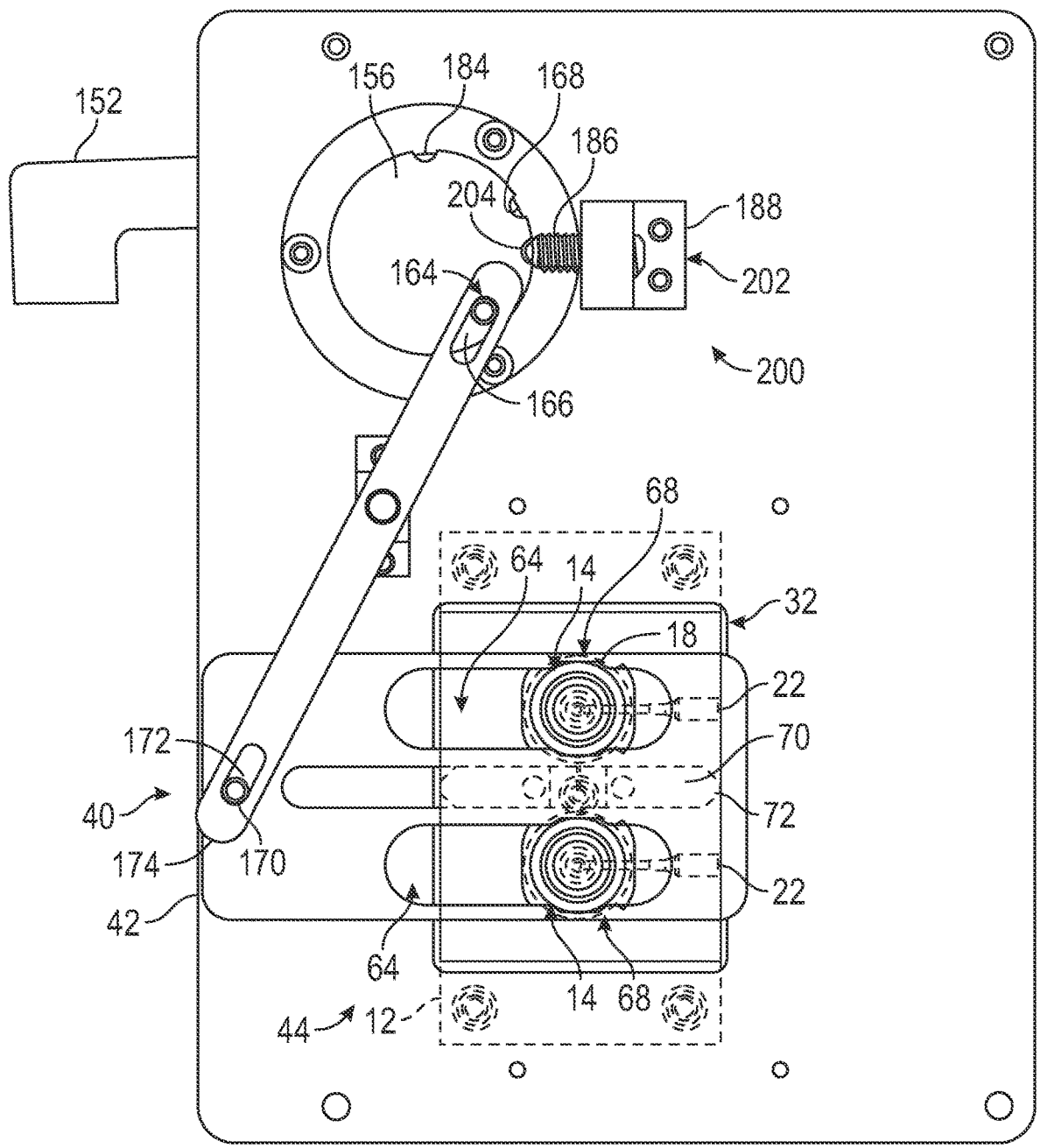
Figure 4C:
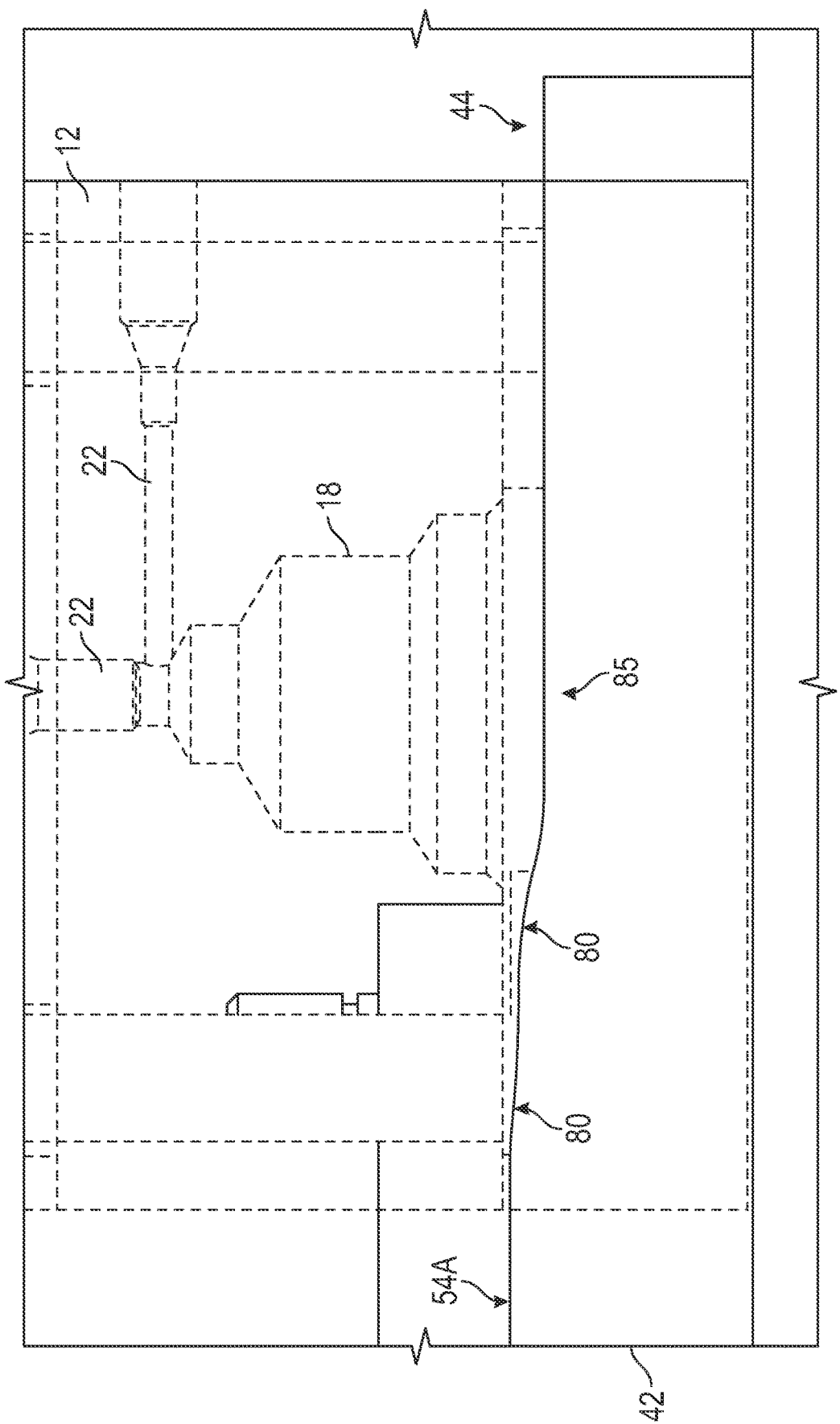

As further shown in FIG. 1, the measurement system's sample port manifold assembly 10 can include a locking assembly 40 to secure the sample tube assembly 14 to the sample manifold 12. In one embodiment, the locking assembly 40 includes a ramp block 42 that is movable between a plurality of positions to facilitate loading of the sample tube assembly 14 into the sample manifold 12 and to lock and hold the sample tube assembly 14 in a substantially sealed position within the sample manifold 12. For example, the ramp block 42 is movable to an open position 44 that allows for loading of or release of the sample tube through one or more openings/slots 64 in the ramp block 42 (FIGS. 4A-C). The ramp block 42 further is movable to one or more intermediate positions, e.g., intermediate position 46 (FIG. 5A-C) or a semi-closed position (not shown), holding or supporting the sample tube assembly 14 within the sample manifold. Additionally, the ramp block 42 is movable to a closed or locked position 48 substantially sealing the sample tube assembly 14 within the sample manifold (FIGS. 6A-D). The ramp block 42 can be actuated or moved by an actuation assembly/mechanism, for example, an operating lever assembly 50 as shown in FIG. 1, that can be moved or otherwise activated to move the ramp block 42 between each of the plurality of positions or other positions or locations.

Figure 2:
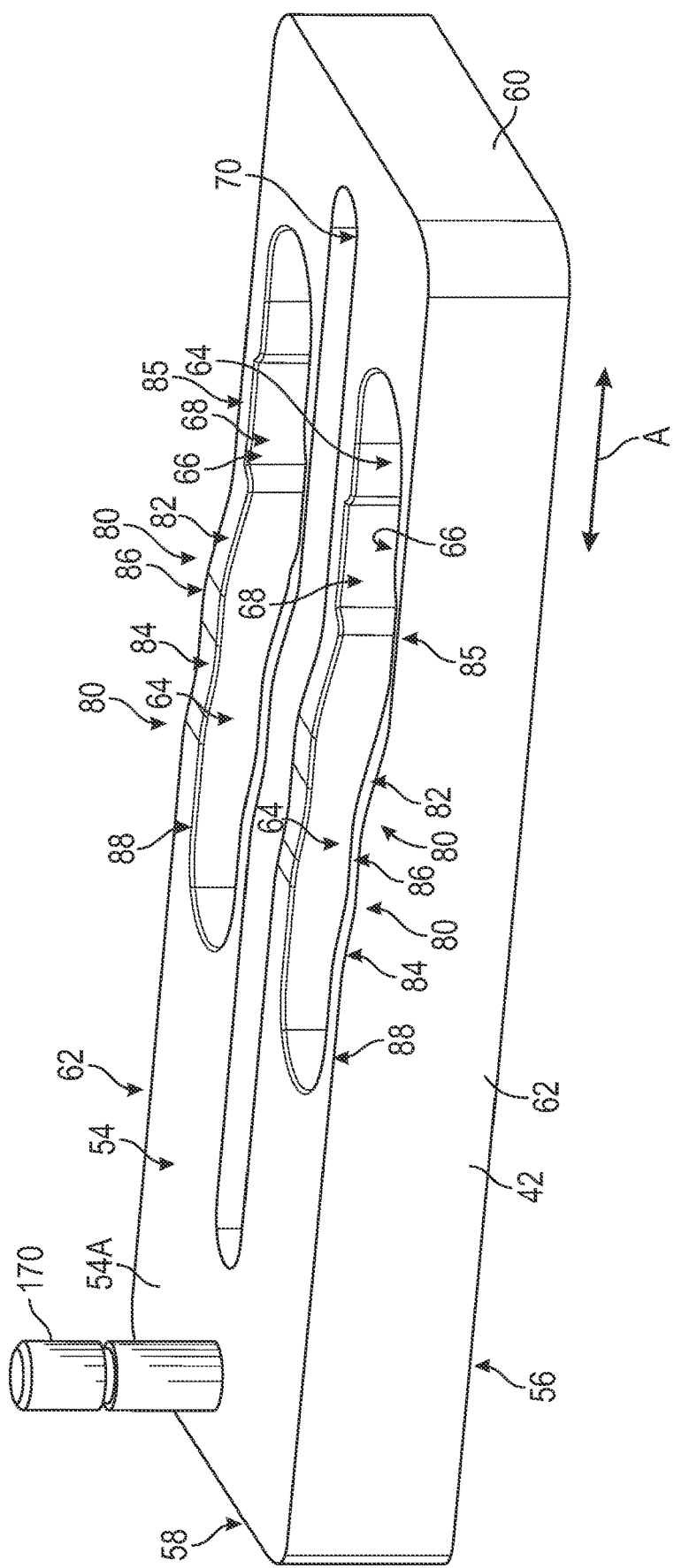
FIG. 2 shows a perspective view of a ramp block of a locking assembly according to one aspect of the present disclosure.

FIG. 2 shows a ramp block 42 according to one aspect of the present disclosure. As shown in FIG. 2, the ramp block 42 generally includes a body 52 that has top 54, bottom 56, front 58, rear 60 and side 62 portions or sections. The body 52 of the ramp block 42 can be formed from a metallic material, such as Brass, Bronze, Phosphor Bronze, or other suitable metallic material, and in one exemplary embodiment, the ramp block body 52 can be formed from corrosion-resistant 954 Bearing Bronze. However, other suitable materials, such as plastics, composites, synthetics, etc., or combinations these and other suitable materials, can be used without departing from the scope of the present disclosure. The body 52 of the ramp block 42 can have a generally rectangular cuboid shape or configuration, though any suitable shapes/configurations, for example, cubic, spherical, polygonal, diamond, triangular shapes or configurations, etc., are possible without departing from the scope of the present disclosure.

FIG. 2 further shows that the body 52 of the ramp block 42 further can have a plurality of slots or openings 64 defined therein that are sized, dimensioned, or configured to receive at least a portion of the sample tube assembly 14 and allow translation or movement of the ramp block 42 thereabout. Additionally, the slots 64 can have one or more openings 66 at least partially defining widened portions 68 of the slots 64. The widened portions 68 can allow the sample tube assembly 14 to be received within the slots 64 when the ramp block 42 is in the open/loading position 44. Additionally, the slots 64 can be at least partially aligned with the bore/holes 18 of the sample manifold 12. As a result, the sample tube assembly 14 can be received through the slots 64 and moved or urged by the ramp block 42 into a sealed position 48 within the sample manifold 12.

As shown in FIGS. 1, 4A-4C, 5A-5C, and 6A-6D, the ramp block 42 can be slidable along/about the upper surface 24A of the base plate 24. The ramp block 42 also can have a slot, notch, or groove 70 defined therealong or therethrough that at least partially receives a portion or section 72 of the sample manifold 12. The slot 70 allows for translation of the ramp block 72 about the sample manifold 12 between each of the plurality of positions. At least a portion of the ramp block 42 along the slot 70 may slidably contact or otherwise engage part of the portion 72 to guide or align the ramp block 42 as the ramp block 42 moves between positions 44, 46, and 48 and/or other intermediate positions.

As further shown in FIGS. 2A-2C, the ramp block 42 can have a plurality of surface features 80 defined therealong that are configured to engage and move at least a portion of the sample tube assembly 14 towards and into engagement with the sample, manifold 12. For example, the surface features 80 can include one or more ramped, angled, or sloped sections or portions 82, 84 defined on an upper surface 54A of the ramp block 42 that are configured to at least partially engage at least a portion of the sample tube assembly 14 as the ramp block 42 is moved between its various positions. For example, the ramp block 42 can have at least one ramped, sloped, or angled section or portion 82 configured to move the sample tube assembly 14 towards or to an intermediate position 46 and/or towards and/or to a semi-closed position. The ramp block 42 further can have at least one ramped, sloped, or angled section or portion 84 configured to move the sample tube assembly to the closed, sealed position 48. The upper surface 54A of the ramp block 42 further can include one or more substantially level or substantially flat sections or portions 85, 86, 88. Sections 85, 86, and 88 can be substantially parallel to the horizontal axis A and/or the upper surface 54A of the ramp block or the upper surface 24A of the base plate.

In one embodiment, the upper surface 54A of the ramp block 42 can include three substantially flat sections 85, 86, 88, with transitional ramped sections 82 and 84 arranged therebetween, such that the ramp block 42 has a stepped configuration or shape. Sections 85 and 88 generally correspond to the open 44 and closed 46 positions, respectively. For example, in the open position 44, the sample tube assembly 14 can be freely moved into and out of the widened portion 68 of the slot(s) 64 of the ramp block 42 to facilitate initial loading and removal of the sample tube assembly 14 to and from the locking assembly 40 (FIGS. 4A-C). Additionally, with the sample assembly 14 inserted into the slot(s) 64, the ramp block 42 can be moved toward the closed position 48 wherein the sample tube assembly 14 is at least partially engaged by the uppermost section 88 and the sample tube assembly 14 is substantially sealed within the sample manifold 12 (e.g., sealing members 112 of the sample tube assembly can be compressed against at least a portion of the sample manifold 12) as generally shown in FIGS. 6A-D.

Figure 5A:
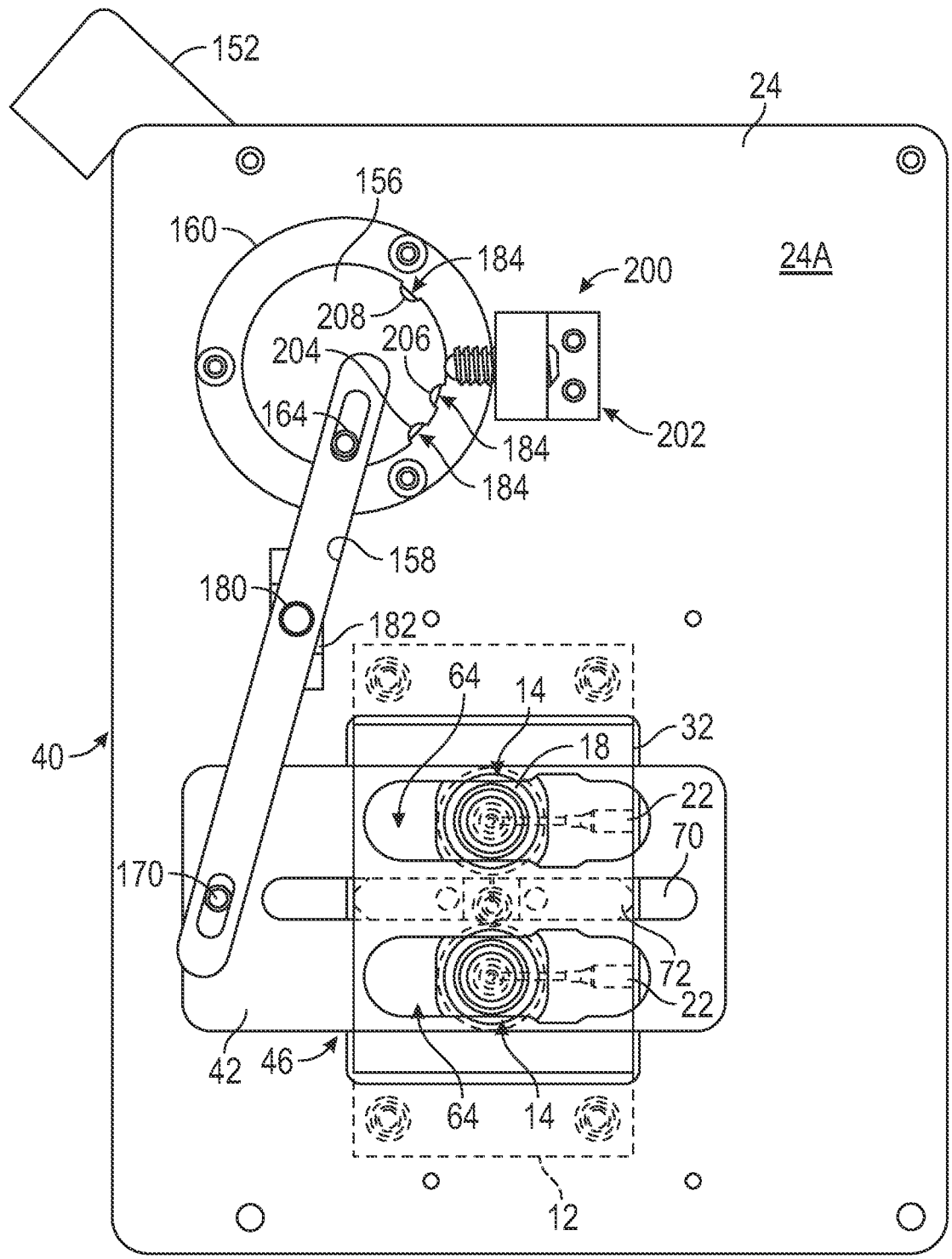
Figure 5C:
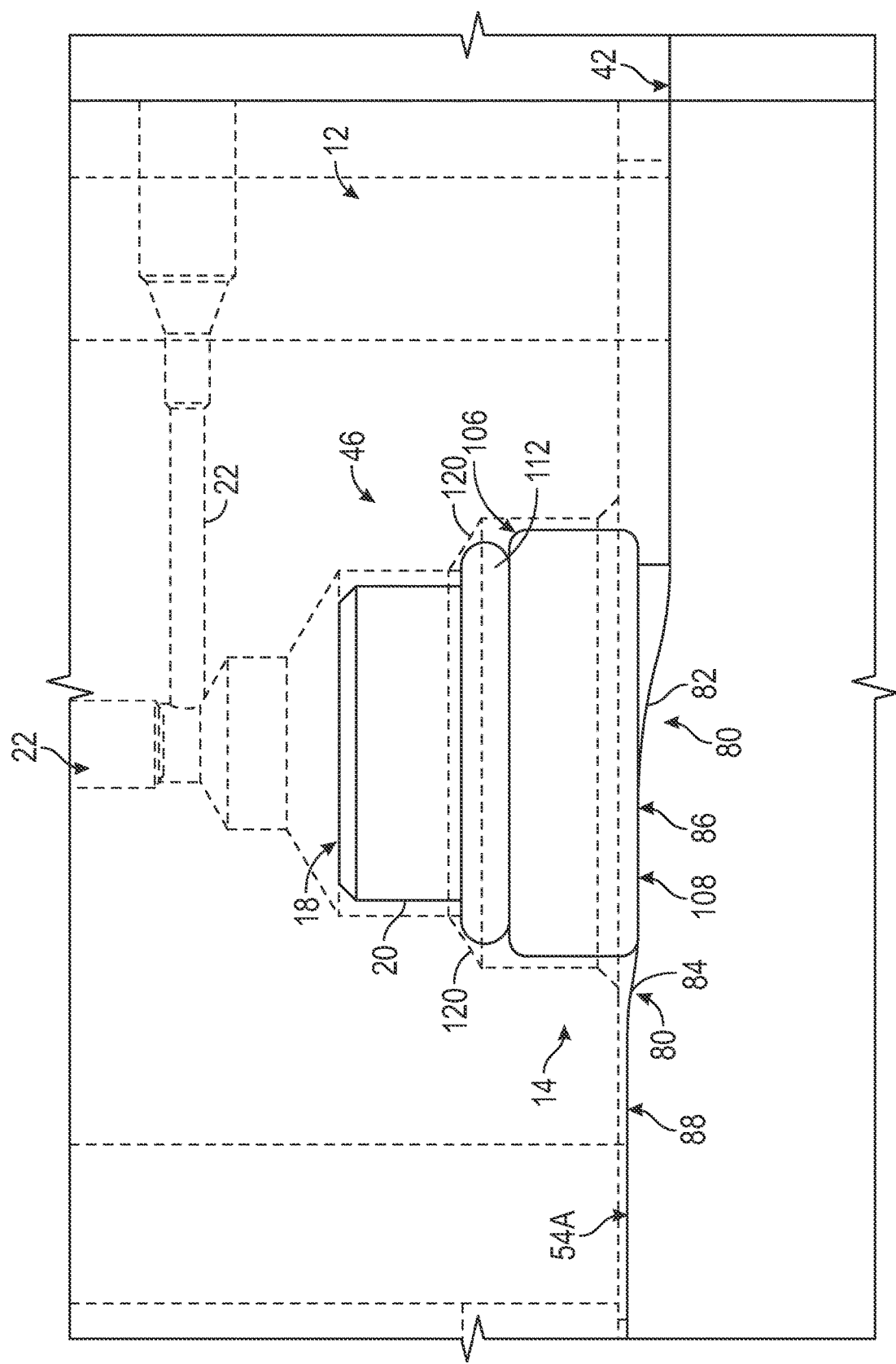

Section 86 further generally corresponds to an intermediate position 46. FIGS. 5A-C show that, with the sample assembly 14 inserted into the slot(s) 64, the ramp block 42 can be moved to the intermediate position 46 and section 86 may at least partially engage the sample tube assembly 14, with at least a portion of the sample tube assembly 14 being at least partially engaged against the sample manifold 12. For example, in the intermediate position 46, the sealing members 112 of the sample assembly may at least partially contact or engage a portion of the sample manifold 12, but may not be substantially compressed to seal the sample tube assembly 14 and sample manifold 12. The intermediate position 46 can facilitate alignment of the sample tube assembly 14, the sealing members 112, and/or the sample manifold 12 and further can allow for ramped section 84 to have a gentle slope or angle to compress the sealing members 112 against the sample manifold 12 and sealed the sample tube assembly 14 therein when the ramp block 42 is moved to the closed position 48. Though three substantially flat sections with transitional ramped sections therebetween are shown in FIGS. 1-6D, the ramp block 42 can have any suitable construction to move the sample tube assembly between the open 44 and sealed/closed 46 positions and/or any other suitable intermediate or semi-closed or semi open positions. For example, the ramp block can have one substantially continuous ramped or sloped section or multiple, e.g. two, three or more, ramped or sloped sections with corresponding flat sections, without departing from the scope of the present disclosure.

Figure 3A:
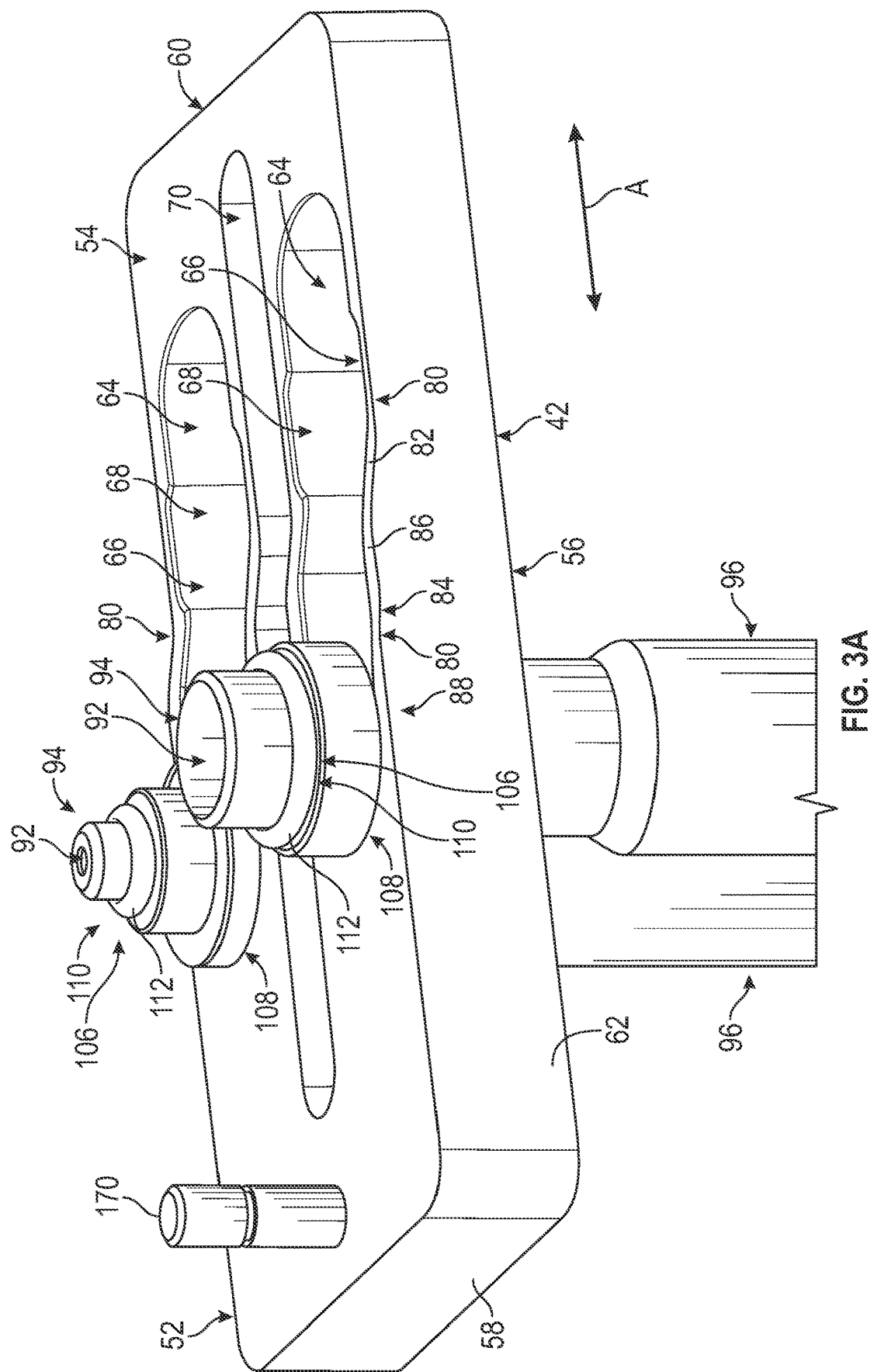
FIGS. 3A-3B show a perspective view of the sample tube assembly and the ramp block, with the ramp block in the closed position, according to principles of the present disclosure.
Figure 3B:
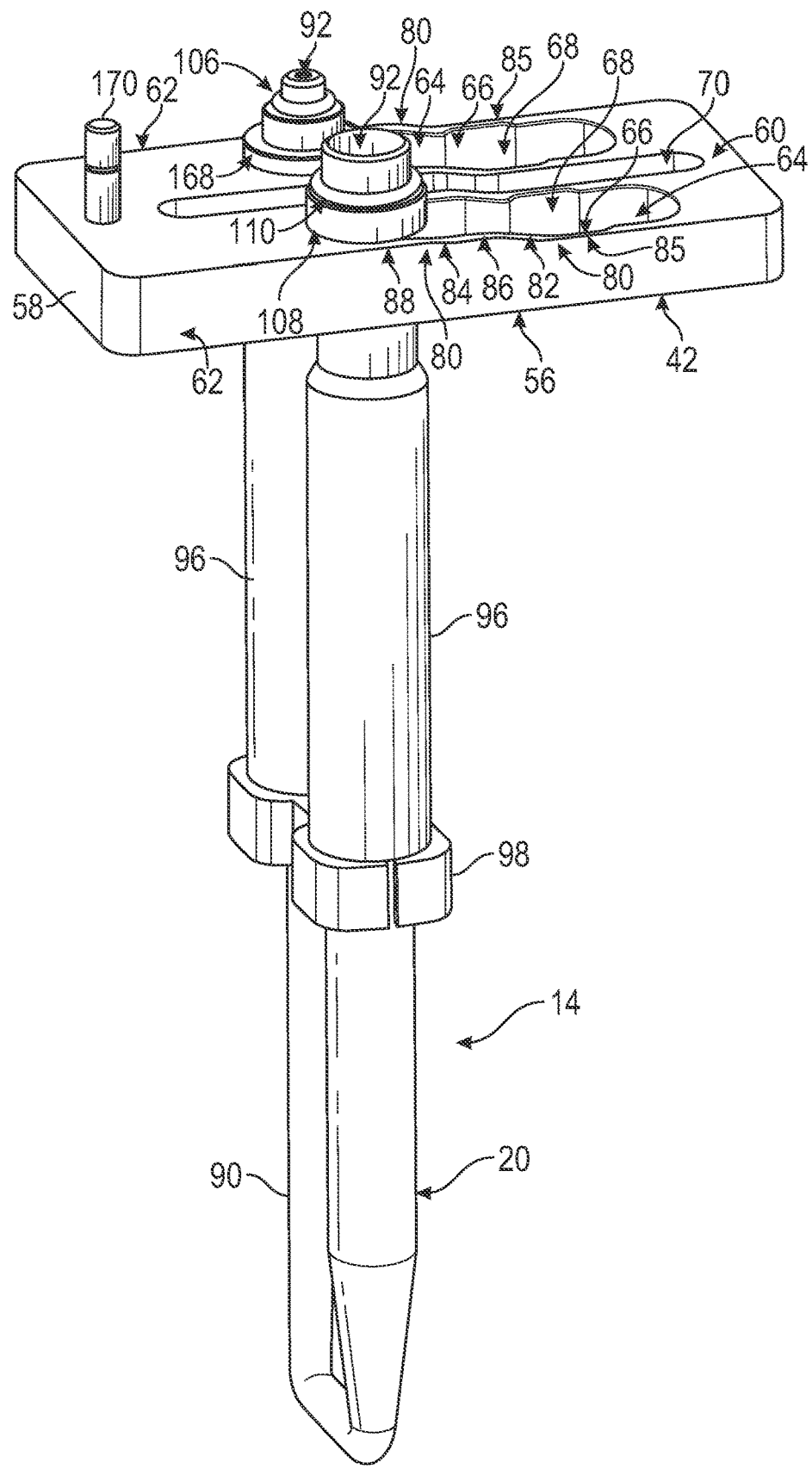

As shown in FIGS. 1 and 3A-3B, the sample tube assembly 14 generally includes one or more sample tubes 20. The sample tube(s) 20 can be made of glass or other suitable material, such as plastics, composites, etc. In one embodiment, the sample tube(s) 20 can be a generally U-shaped sample tube(s) with a pair of legs 90. Each leg 90 can have a generally cylindrical shape, though the legs and/or the sample tube can have any suitable shape, without departing from the present disclosure. In addition, legs 90 can have an opening 92 at an upper/top portion 94 thereof, and the openings 92 can facilitate receipt of a sample(s) and/or one or more gases for testing of the sample(s). For example, one or more gases (or other fluid media) may be introduced into the sample tube 20 for testing of samples with the measurement system. The sample assembly 14 further may have one or more collets 96 that are coupled to or attached to the sample tube(s) 20. The collets 96 can be secured to the sample tube(s) 20 by at least one clamping mechanism 98. For example, the clamping mechanism 98 can include a front clamp 102 portion/section and a rear clamp 102 portion/section that are connected together by one or more fasteners 104, such as a screw, bolt, etc., though any other clamping and/or other suitable attachment mechanism can be used without departing from the present disclosure. Each collet 96 further can have a notch or groove 104 defined in an outer surface of a body 106 of the collet 96. The notch or groove 104 can be formed/defined substantially adjacent or substantially proximate to an upper portion 106 of the body 106 of the collet. The notch/groove 104 further can define or provide one or more shoulders or faces 108 for engaging or otherwise interact with the surface features 80 of the ramp block 40. The notch/groove may be optional, however, and the outer surface of the collets can have one or more projecting portions positioned therealong that include or define one or more surfaces/faces or other suitable portions, sections, etc. for engaging the ramp block.

As further shown in FIGS. 1 and 3A-3B, the sample tube assembly 14 also includes one or more sealing members 112. The sealing member(s) 112 may facilitate a substantially gas tight (or fluid tight) seal between the sample tube assembly 14 and the sample manifold 12. For example, the sealing members 112 can include O-rings that can be received within a corresponding seat along the upper portion of the collet. The O-rings can be formed from an elastomer, such as Bura-N, Viton, Kalrez, etc., or other suitable sealing material, and can be sized to be self-retaining on the legs 90 of the sample tube 20 along the top portion of the collets. In one embodiment, the upper portion 106 of the collets further can include a surface or face 110 for at least partially engaging the one or more sealing members 112. The sealing members 112 also can facilitate sealing of the sample tube to the sample manifold, and further can at least partially engage the bores 18 of the sample manifold 12 to help to reduce the likelihood of or prevent the sample tube assembly 14 from disengagement before the ramp block 42 is in the locked position 48.

FIGS. 4A-4C show the locking mechanism 40 with the ramp block 42 in the open position 44. As shown in FIGS. 4A-4C, with the ramp block 42 in the open position 44, the sample tube assembly 14 can be at least partially received through the widened portion 68 of the slots 64 defined through the ramp block 42. With the sample tube assembly 14 received at least partially through the slots 64 of the ramp block, the ramp block 42 may be positioned at least partially within the notch 104 defined in the body 106 of the collets so that the ramp block 42 can at least partially engage the shoulder or face 108 of the collets as the ramp block 42 is moved to the locked position 48 or other intermediate or semi-closed positions.

FIGS. 5A-5C show the ramp block 42 in an intermediate position 46. As shown in FIGS. 5A-5C, when the ramp block 42 is moved toward the intermediate position, e.g., through activation of a lever 152 of other actuation mechanism, the surface or face 82 of the ramp block 42 may at least partially engage or contact (e.g., slidably engage) the shoulder or face(s) 108 of the collets to move the sample tube assembly 14 upward and toward the sample manifold 14. In one example embodiment, as the ramp block 42 is moved towards the intermediate position 26, the sloped, slanted, or ramped section 82 of the ramp block 42 may slidably contact or otherwise engage the surfaces or faces 108 of the collets to move the sample tube assembly 14 upward into the bores 18 of the sample manifold 12. With the ramp block 42 in the intermediate position 46, the substantially flat section 86 of the ramp block 42 may at least partially engage surfaces 108 of the collets and the sealing members 112 of the sample tube assembly 14 may at least partially contact or engage a portion, e.g., surface/face 120 of the bores 18 of the sample manifold 12, and the sealing members 112 may engage by may not be substantially compressed against the surface/face 120 of the bores 18.

FIGS. 6A-6D show the ramp block 42 in the sealed/closed position 48. As shown in FIGS. 6A-6D, when the ramp block 42 is moved to the closed or sealed position 48, the faces or surfaces 108 of the collets are slidably engaged by the angled, sloped, slanted, ramped surfaces 84 of the ramp block 42 to move or urge the sample tube assembly 14 further into the bores 18 and put the sealing members 112 (e.g., O-rings), as arranged along the upper portion 106 of the collets, into engagement with at least a portion of the sample manifold 12. For example, the sealing members 112 can be pressed against one or more surfaces or faces 120 of the bores 18 of the sample manifold 12. With the ramp block 42 moved fully into the locked position 46, the sealing members 112 will be compressed or otherwise pressed against the surfaces/faces 120 of the bores 18 and the surfaces/faces 110 of the collets in a sandwich-like arrangement to create a substantially gas tight seal between each leg of the sample tube assembly 14 and the sample manifold 12, which also can accommodate for variations in materials, such as size variations in glassware, the collets, etc. It should be understood that, as this motion is generally linear rather than rotational, tearing or damage to the sealing members may be substantially reduced/avoided during loading and locking of the sample tube assembly.

Figure 7A:
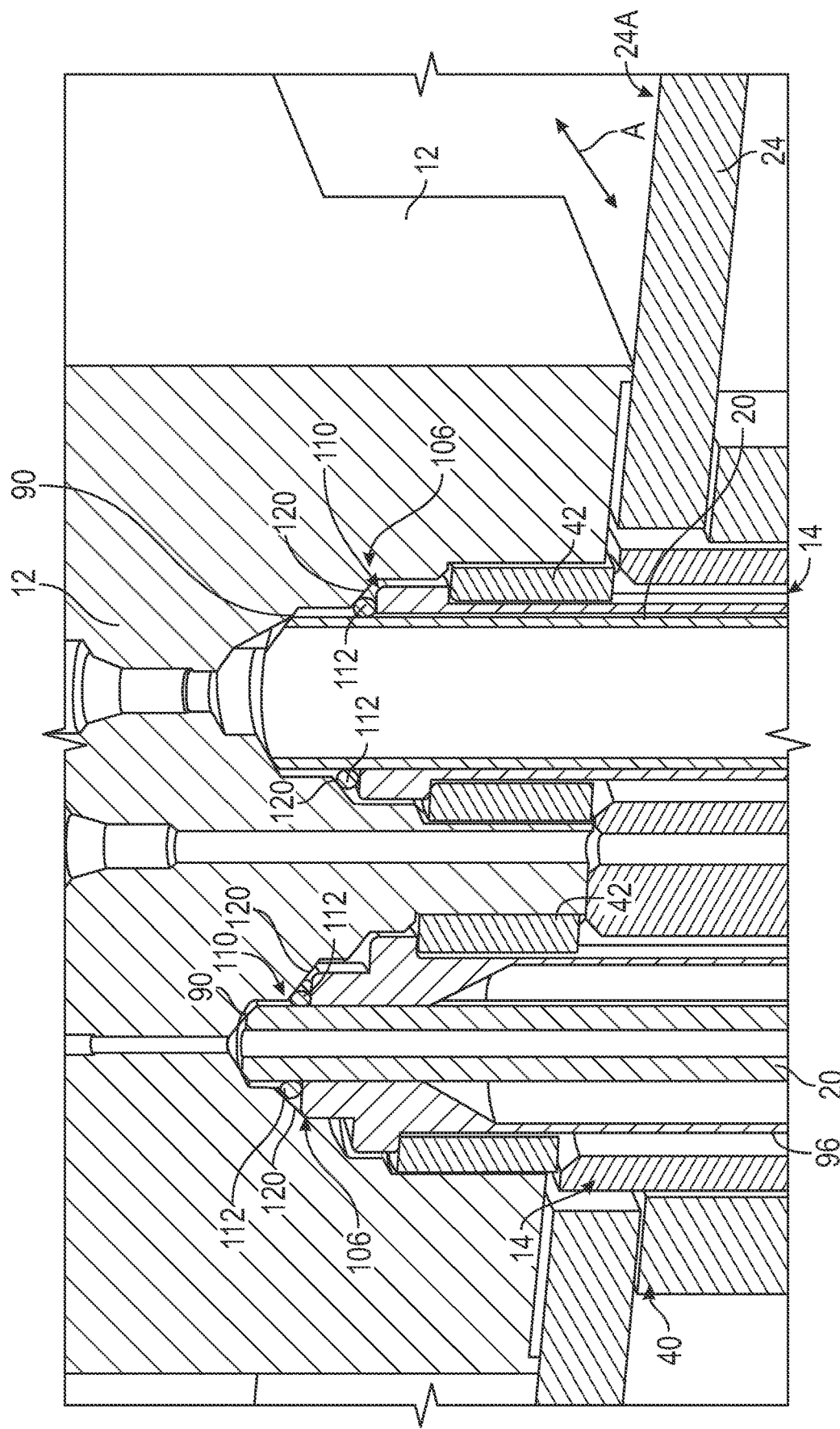

FIGS. 7A-C show cross-sectional views of the locking assembly 40. As generally shown in FIGS. 7A-C, the surfaces/faces 120 of the bores 18 can be angled, slanted, or sloped. For example, the surfaces/faces 120 of the bores 18 can be arranged so as to be transverse to the horizontal axis A, the upper surface 54A of the ramp block 42, or the upper surface 24A of the base plate. As a result, with the ramp block 42 in the closed position 48, the slanted or angled surfaces 120 can urge or force the sealing members 112 (e.g., O-rings) inwardly and against the legs 90 of the sample tubes 20 providing a multipoint seal, for example, a 3-point seal with points of pressure on each leg 90 of the sample tube, surfaces 110 of the collet, and the surfaces 120 of the bores 18. However, the surfaces 120 of the bores 18 of the sample manifold can have any suitable construction, and for example, can be generally parallel to the horizontal axis A, the upper surface 54A of the ramp block 42, or the upper surface 24A of the base plate, without departing from the scope of the present disclosure.

Returning to FIG. 1, it can be seen that, in one embodiment, the actuating assembly 50 can include an operating lever 152 that can be actuated to move the ramp block 42 between the plurality of positions. The operating lever 152 can include a body 154 that is operatively connected to a driveshaft 156. The driveshaft 156 can be coupled to the body 154 of the lever by one or more fasteners or any other suitable connection mechanism. In one embodiment, the driveshaft 156 can be in communication with the ramp block 42 through a lever arm 158 to drive movement/translation of the ramp block 42. The driveshaft 156 may be at least partially received within a bushing 160 rotatably coupled within an opening 162 defined in or through the base plate 24 such that the driveshaft 156 is rotatable thereabout. In addition, a drive pin 164 coupled to the driveshaft 156 can be received within an opening or slot 166 in a first end 168 of the lever arm 158. The lever arm 158 further can be connected to a ramp block drive pin 170 or other suitable member coupled to the ramp block 42. The ramp block drive pin 170 can be at least partially received within an opening 172 adjacent a second end 174 of the lever arm 158. The lever arm 158 can be connected to the driveshaft drive pin 164 or ramp block drive pin 170 using any suitable connection mechanism, such as an E-clip 176 having one or more washers 178, though other suitable connections, such as screws, bolts, or other fasteners, fastening mechanisms, etc., are possible without departing from the scope of the present disclosure. For example, a fastener, such as a screw or bolt, with a washer or bushing received thereabout, could be used in place of the drive pins 170 and 164 to secure the lever arm 158 to the drive shaft 156 and/or ramp block 42.

As further show in FIG. 1, the driveshaft 156 can be pivotably mounted to the base plate 24. In one embodiment, a support 180 or other suitable member can be rotatably or pivotably mounted within a pivot block 182 that is connected to the upper surface 24A of the base plate. Accordingly, when the operating lever 152 is actuated or otherwise activated, the driveshaft 156 may rotate and move, e.g., pivot or rotate, the lever arm 158 to urge the ramp block 42 between each of the plurality of positions 44, 46, and 48 and/or other suitable positions/locations.

The actuating assembly is not limited to a lever mechanism/arrangement as shown in FIGS. 1 and 4A-6D, however, and can include any suitable actuation assembly, such as one or more motors or actuators that automatically move/translate the ramp block between its plurality of positions. For example, the driveshaft 156 can be in communication with one or more motors that rotate the driveshaft 156 to move the ramp block 42 between each of the plurality of positions. However, other suitable actuators such as air cylinder actuators, air driven compact guide cylinders, tie-rod air cylinders, electrically driven linear actuators, electrically driven rotary gear drive actuators, etc. and/or other drive mechanisms, such as rack and pinion drives, linear motor drives, piston drives (e.g., air or electric piston drives), pneumatic slide actuation mechanisms, etc., and/or combinations of these and other mechanisms, can be used to drive movement of the ramp block without departing from the scope of the present disclosure. These drive assemblies further can be used in conjunction with one or more electrical or optical sensing assemblies to provide feedback to a user/driver of the positions of the ramp block.

Figure 6A:
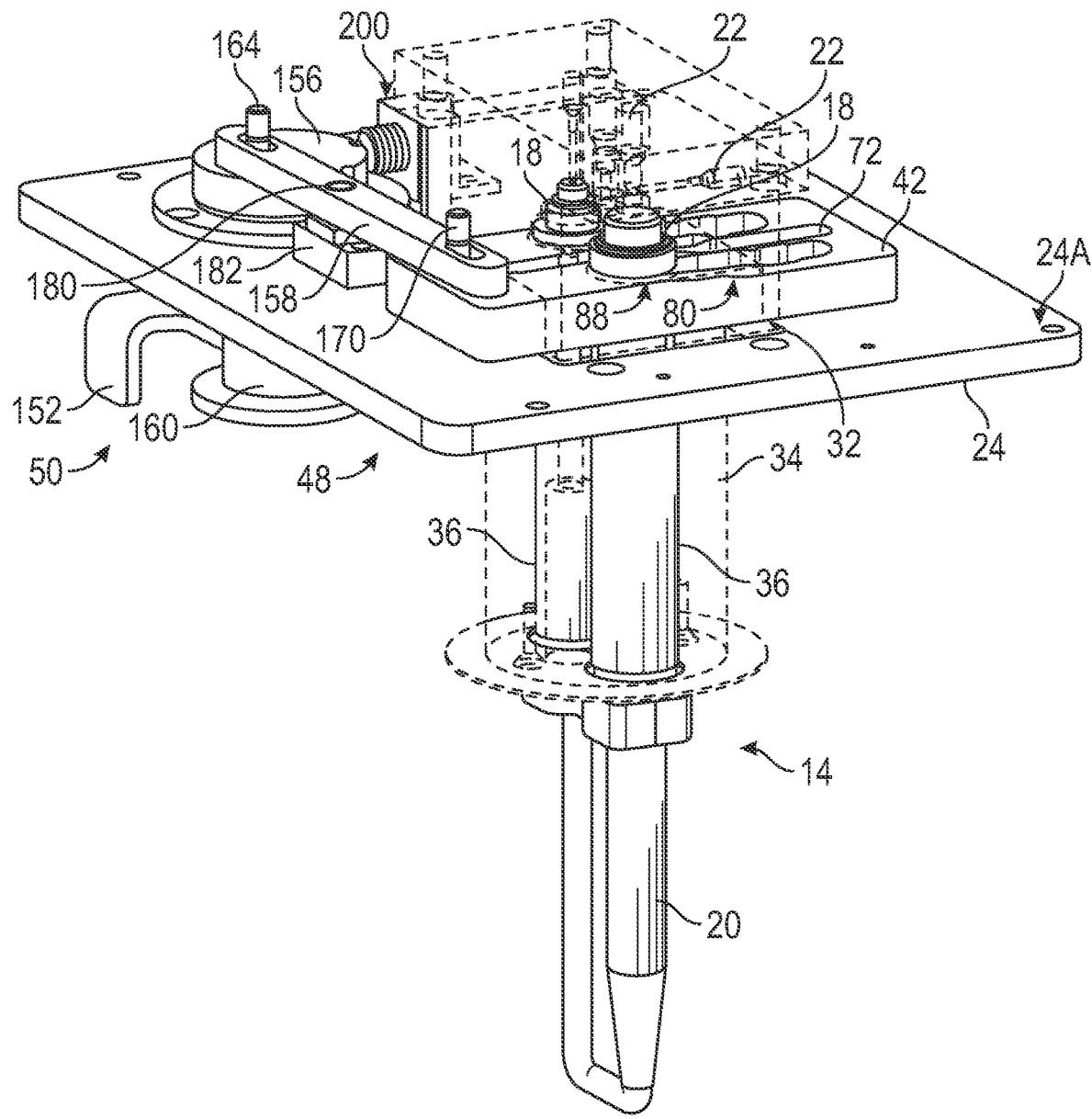
FIGS. 6A-D show prospective, planned and side views of the locking assembly with the ramp block in the closed or locked position.
Figure 6B:
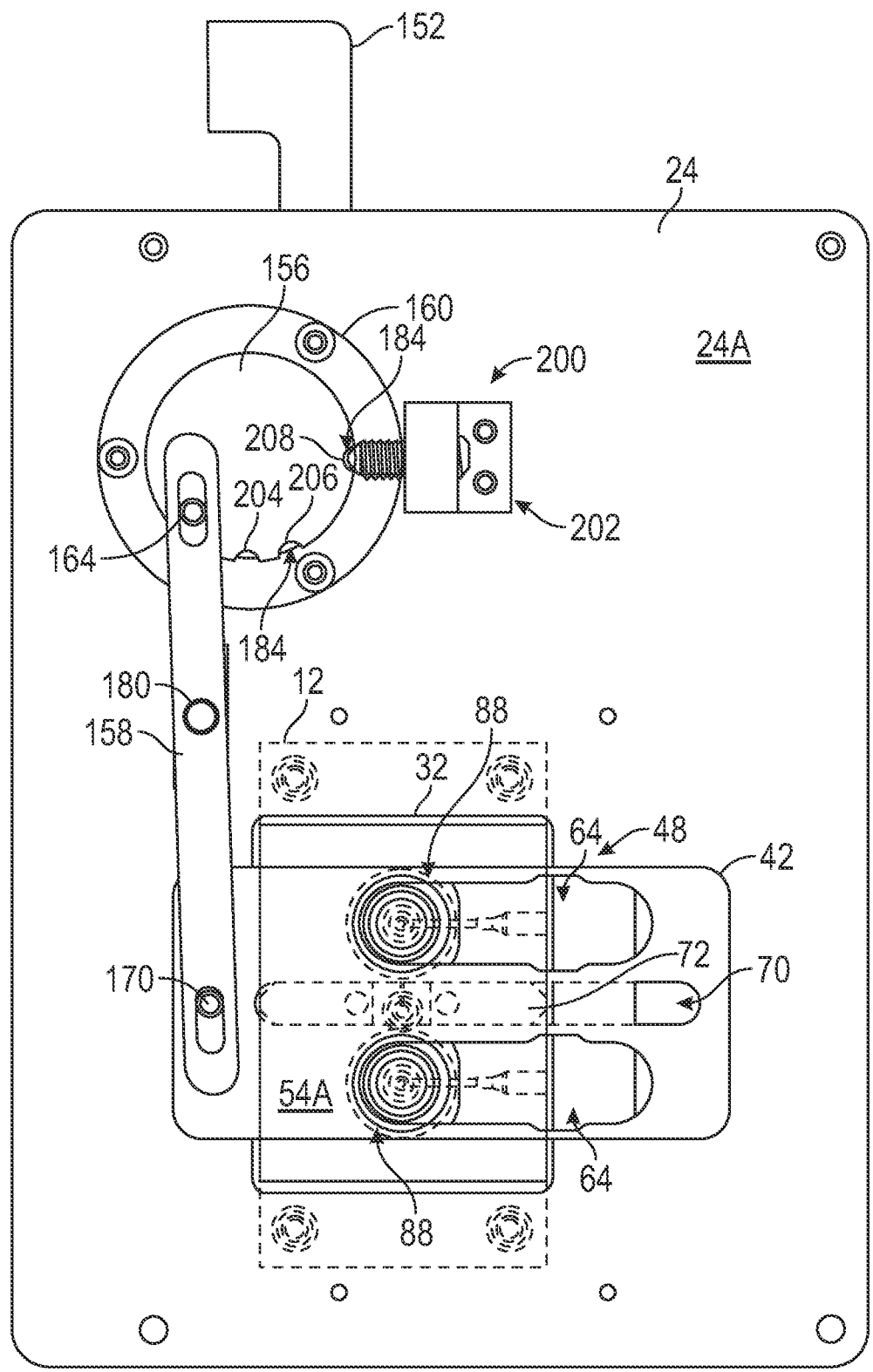
Figure 6C:
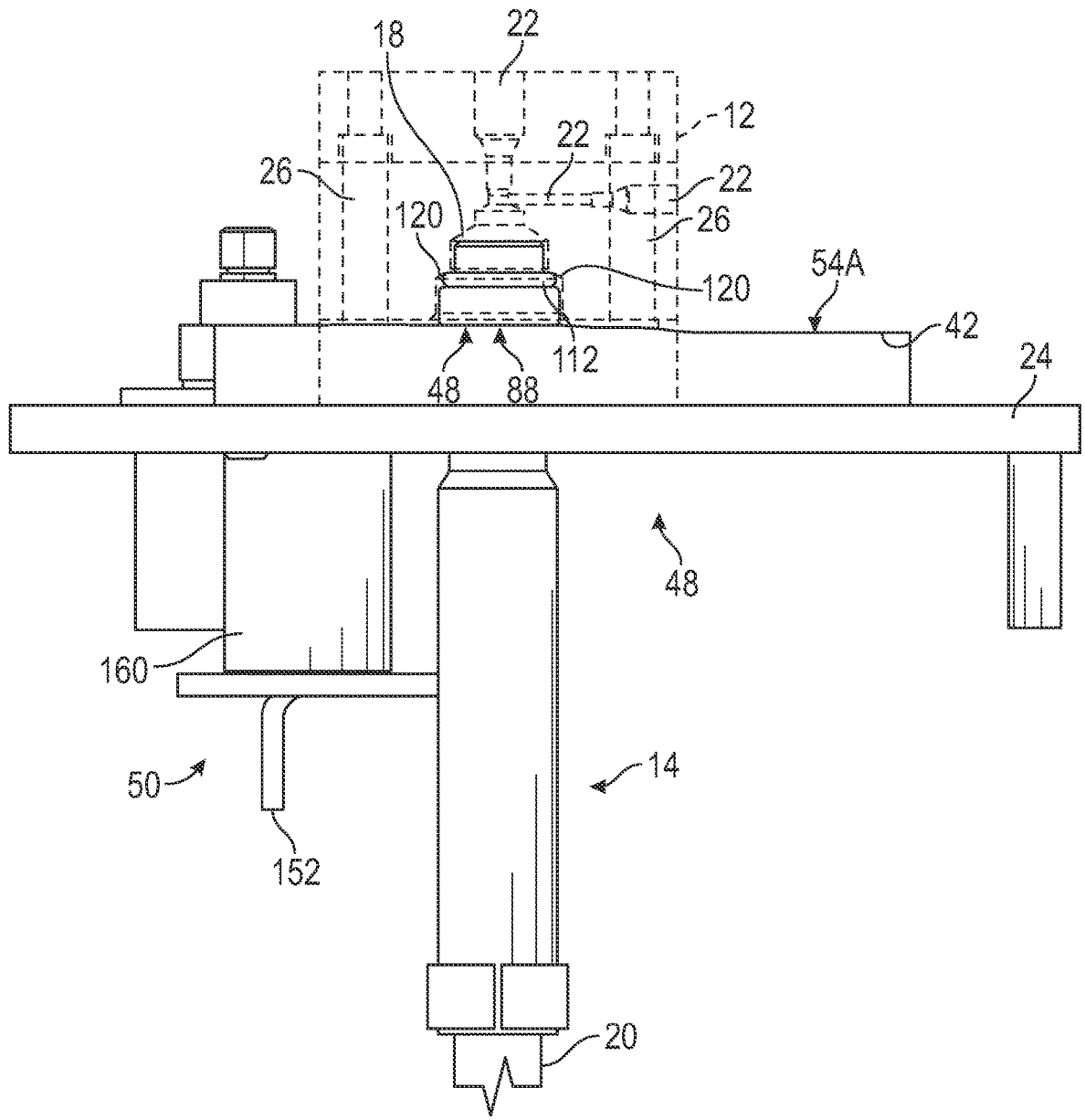
Figure 6D:
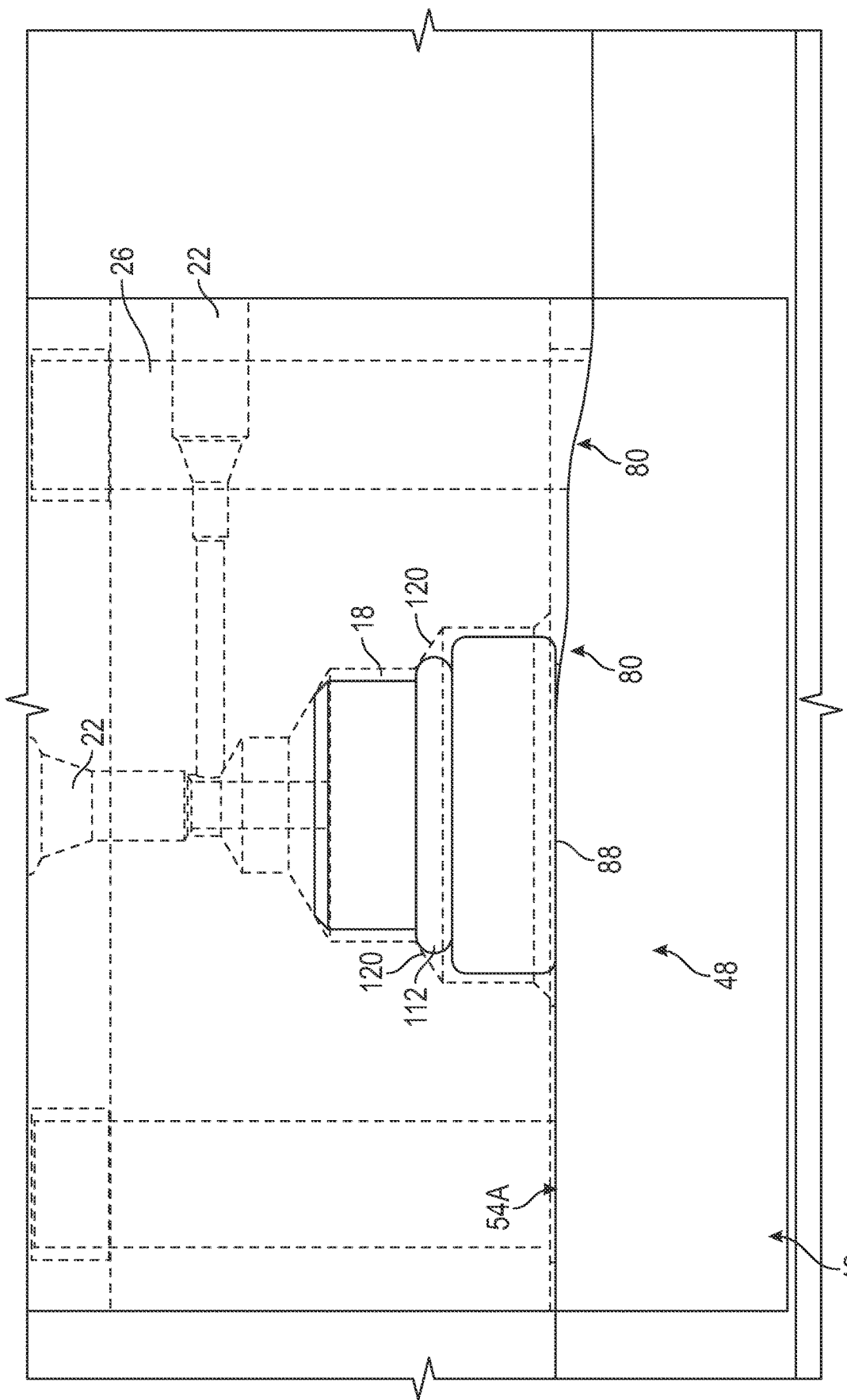

As additionally shown in FIGS. 4A, 5A, and 6B, the locking mechanism/assembly 40 also can include a feedback assembly 200 for locating the ramp block 42 and to provide haptic feedback to the user that the ramp block 42 and/or the sample tube assembly 14 are in a specific position or location, e.g., the open position, semi-closed position, or closed position, or another suitable intermediate position or location. In one embodiment, the feedback assembly 200 can include a plurality of notches or detents 184 defined along the driveshaft 156 and a plunger assembly 202 mounted adjacent thereto. The plunger assembly 202 can include a spring plunger 186 that is mounted to the base plate by a spring plunger mount 188. The spring plunger 186 may communicate with the plurality of detents 184 to provide haptic feedback on the location/positioning of the ramp block, for example, to notify the user when the sample tube assembly is sealed, in the release position or just prior to the release position and/or other intermediate positions.

In one embodiment, the plunger 186 can be at least partially received or otherwise located in one of three detents 204, 206, 208 on the driveshaft 156 to provide haptic feedback to the user that the locking mechanism is in one of three positions. As shown in FIG. 4A, with the ramp block 42 in the open position 44, the plunger 186 is located in detent 204. Additionally, in the open position 44, the plunger 186 and detent 204 also can lightly hold the ramp block 42 in the open position 44 so that the sample tube assembly 14 may be removed or inserted unhindered by mis-positioned or mis-aligned components of the locking mechanism. Still further, with the ramp block 42 in the fully closed and sealed position 48, the plunger 186 will be located in detent 208 as generally shown in FIG. 6B.

Additionally, the plurality of detents 184 can include one or more detents to indicate that the ramp block 42 is in one or more intermediate positions, such as intermediate position 46, which also can help to at least partially hold the ramp block 42 in the one or more intermediate positions. As shown in FIGS. 4A, 5A, and 6B, the plurality of detents 184 can include one detent 206 to indicate, or help to hold, the ramp block 42 in a semi-closed position (not shown). In one embodiment, the detent 206 can be a physical and haptic stop just before the sample tube assembly 14 is released from, or just after the sample tube assembly 14 is inserted to, the locking mechanism 40, for example, to prevent the user from accidently or prematurely releasing the sample tube assembly 14 from the sample manifold 12. Additionally, the detent 206 also can provide feedback to the user when inserting the sample tube assembly 14 to inform the user that the sample tube assembly 14 is securely retained (but not yet sealed) and will not accidently fall out or otherwise be released from the sample manifold 12 if not supported by the user. One or more cam features further can be provided along the drive shaft 156 adjacent to or just before the open position detent 204, such that moving the locking mechanism beyond detent 206 requires additional force on the spring plunger 186 to obtain the release position 204, e.g., to safeguard against accidental release of the sample tube assembly, if the user operates the lever 152 without holding or supporting the sample tube assembly 14.

FIG. 7B further shows that the sample tube assembly 14 further can include one or more retaining features 210 to help safeguard against unintended release of the sample tube assembly 14 from the sample manifold 12. For example, the retaining features 210 can include one or more members 212, such as radial springs (e.g., a Bal Spring® canted coil springs), spring plungers, O-rings, or other suitable retaining members, located in grooves, e.g., radial grooves 214, defined about the collets 90. The retaining features 210 can at least partially engage the bores 18 of the sample manifold 12 and/or the bores 36 of the guide block 34, for example, to provide additional friction between the sample tube assembly 14 and the bores 18 of the sample manifold 12 and/or the bores 36 of the guide block 34 and prevent sudden release of the sample tube assembly 14, and potential damage thereto, from the sample manifold 12, e.g., when the sample tube assembly 14 is not supported by a user.

The feedback assembly 200 further can be in communication with a controller or processor, for example, a controller or processor of the measurement system or other suitable controller or computing device, which may communicate with one or more display or audio mechanisms or devices, such as monitors or speakers, for example, to provide notifications or alarms when the ramp block is in the open, intermediate, semi-closed and locked positions. In addition, or in the alternative, one or more sensors can be used to electronically indicate to the controller that the locking mechanism has reached, or is in, one or more specific positions. The feedback assembly 200 further is not limited to the construction shown in the figures and can include any suitable mechanism or sensing devices for locating the position of the locking mechanism, for example, the feedback assembly can employ solenoid actuated plungers that are triggered by positional sensors and/or other suitable mechanisms or combinations thereof, without departing from the scope of the present disclosure.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A measurement system, comprising:
   a sample manifold configured to receive a sample tube; and
   a locking assembly configured to engage at least partially a portion of the sample tube, configured to enable a loading of the sample tube into the sample manifold and configured to hold the sample tube in a substantially sealed position within the sample manifold; and
   a feedback assembly including one or more sensors configured to provide a feedback response related to a position of the locking assembly.

2. The measurement system of claim 1, wherein the sample manifold comprises a body with one or more fluid passageways configured for fluid communication with the sample tube when the portion of the sample tube is at least partially received by the locking assembly.

3. The measurement system of claim 1, wherein the locking assembly comprises a ramp block that is moveable between a plurality of positions and includes one or more surface features defined along the ramp block; wherein the surface features are configured to move the sample tube so as to engage with the sample manifold as the ramp block is moved from an open position toward a closed position.

4. The measurement system of claim 3, wherein the surface features include one or more ramped surfaces, angled surfaces, sloped surfaces, flat surfaces, or combinations thereof.

5. The measurement system of claim 1, further comprising a controller comprising at least one processor; and wherein the one or more sensors are configured to locate and communicate a position of the locking assembly to the controller.

6. The measurement system of claim 1, further comprising a base plate on which the sample manifold is mounted, and along which the locking assembly is movable; and
 a guide block configured to receive the at least a portion of the sample tube and to at least partially insulate the sample tube from the sample manifold.

7. The measurement system of claim 1, wherein the locking assembly further comprises an actuating assembly configured for moving the locking assembly relative to the sample manifold.

8. The measurement system of claim 7, wherein the locking assembly further comprises a ramp block, and wherein the actuating assembly is configured to move the ramp block between an open position for an insertion of the sample tube into an engagement with the sample manifold and a second or additional positions.

9. The measurement system of claim 7, wherein the actuating assembly comprises one or more motors, air cylinders, air driven compact guide cylinders, tie-rod air cylinders, electrically driven linear actuators, electrically driven rotary gear drive actuators, rack and pinion drives, piston drives, pneumatic slide actuation mechanisms, lever mechanism, or combinations thereof.

10. The measurement system of claim 1, wherein the locking assembly further comprises an actuator, a ramp block, and a lever arm coupled to a drive shaft of the actuator so as to be driven by the actuator; and
 wherein the ramp block is connected to the lever arm to drive a movement of the ramp block upon an actuation of the actuator.

11. The measurement system of claim 10, further comprising a controller having at least one processor, and a feedback assembly in communication with the controller; wherein
 the feedback assembly includes a plurality of detents arranged along the drive shaft and a plunger adapted to engage the plurality of detents to provide an indication of a position of the ramp block during a movement of the ramp block.

12. The measurement system of claim 11, further comprising a spring configured to apply a biasing force to the plunger so as to engage with the plurality of detents to substantially hold the ramp block in a position until an additional force sufficient to overcome the biasing force is applied to the plunger.

13. The measurement system of claim 1, further comprising a controller having at least one processor, and wherein the locking assembly further comprises an actuator configured for automatically moving the locking assembly between a plurality of positions relative to the sample manifold.

* * * * *